United States Patent
Bradfield

(10) Patent No.: US 12,476,508 B2
(45) Date of Patent: Nov. 18, 2025

(54) DECOUPLED OIL FEED FOR INTERNAL ROTOR COOLING

(71) Applicant: BorgWarner Inc., Auburn Hills, MI (US)

(72) Inventor: Michael Duane Bradfield, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 256 days.

(21) Appl. No.: 17/969,234

(22) Filed: Oct. 19, 2022

(65) Prior Publication Data

US 2024/0136877 A1 Apr. 25, 2024
US 2024/0235305 A9 Jul. 11, 2024

(51) Int. Cl.
*H02K 3/24* (2006.01)
*H02K 9/197* (2006.01)

(52) U.S. Cl.
CPC ............... *H02K 3/24* (2013.01); *H02K 9/197* (2013.01)

(58) Field of Classification Search
CPC ............ H02K 1/22; H02K 1/223; H02K 1/24; H02K 1/27; H02K 1/2706; H02K 1/28; H02K 1/32; H02K 3/24; H02K 9/12; H02K 9/16; H02K 9/19; H02K 9/193; H02K 9/197; H02K 9/24
See application file for complete search history.

(56) References Cited

U.S. PATENT DOCUMENTS

| | | | | |
|---|---|---|---|---|
| 3,800,174 | A * | 3/1974 | Butterfield | H02K 9/19 310/61 |
| 2008/0197725 | A1* | 8/2008 | Husband | H02K 3/24 310/59 |
| 2012/0068656 | A1* | 3/2012 | Fulton | H02K 9/19 318/497 |
| 2020/0259397 | A1* | 8/2020 | Mohammed | H02K 9/19 |
| 2021/0281143 | A1* | 9/2021 | Lambourg | H02K 1/20 |

FOREIGN PATENT DOCUMENTS

| | | | | |
|---|---|---|---|---|
| CN | 111884428 A | * | 11/2020 | ............ H02K 1/32 |
| WO | WO-2021063591 A1 | * | 4/2021 | ............ H02K 1/32 |

OTHER PUBLICATIONS

CN111884428A—Translation (Year: 2024).*
17969234_2024-07-17_WO_2021063591_A1_H.pdf (Year: 2024).*

* cited by examiner

*Primary Examiner* — Christopher M Koehler
*Assistant Examiner* — Ahmed F Seck
(74) *Attorney, Agent, or Firm* — Reising Ethington P.C.

(57) ABSTRACT

A rotating electric machine receiving a flow of fluid at a rotor includes a stator having stator slots and a plurality of stator windings for receiving electrical current; the rotor, concentrically received within the stator, including: at least one axially-extending fluid channel in fluid communication with an end face of the rotor and an opposite end face of the rotor, wherein the axially-extending fluid channel is configured to receive fluid applied by a fluid outlet spaced a distance from the end face of the rotor.

4 Claims, 3 Drawing Sheets

DECOUPLED OIL FEED FOR INTERNAL ROTOR COOLING

TECHNICAL FIELD

The present application relates to rotary electric machines and, more particularly, to cooling rotary electric machines.

BACKGROUND

Rotary electric machines generally include a stator that receives stator windings and a rotor positioned concentrically relative to the stator such that the flow of electrical current through the stator windings induces the angular displacement of the rotor relative to the stator. The flow of electrical current through the stator windings generates heat that can also impinge on the rotor as well. Managing or reducing the amount of heat generated by the operation of the rotary electric machines can increase the efficiency and power density of the machines.

SUMMARY

In one implementation, a rotating electric machine receiving a flow of fluid at a rotor includes a stator having stator slots and a plurality of stator windings for receiving electrical current; the rotor, concentrically received within the stator, including: at least one axially-extending fluid channel in fluid communication with an end face of the rotor and an opposite end face of the rotor, wherein the axially-extending fluid channel is configured to receive fluid applied by a fluid outlet spaced a distance from the end face of the rotor.

In another implementation, a rotating electric machine receiving a flow of fluid at a rotor includes a stator having stator slots and a plurality of stator windings for receiving electrical current; the rotor, concentrically received within the stator, including: a plurality of axially-extending fluid channels, angularly spaced within the rotor around an axis of rotation, in fluid communication with an end face of the rotor and an opposite end face of the rotor, wherein the axially-extending fluid channels are configured to receive fluid applied by a fluid outlet spaced a distance from the end face of the rotor.

DETAILED DESCRIPTION

A rotating electrical machine includes a rotor having axially-extending fluid passages that open to an end face or axial end face of the rotor to permit fluid, such as engine oil, to flow substantially axially through the rotor toward an opposite end face thereby cooling both the rotor and the stator. A fluid outlet can be directed at the end face of the rotor, such that the supply of fluid is not directly coupled to the rotor, but rather aimed at and sprayed on the end face. In some implementations, a fluid outlet or nozzle can be positioned at both end faces of the rotor. In this configuration, the pressure of the fluid flowing through the rotor can be uncoupled from the pressure generated by a fluid pump. Fluid can be drawn into the axially-extending fluid passages at the end face and centrifugal force created from rotor angular velocity during operation of the rotating electrical machine can move fluid through the axially-extending fluid passages and then exit the rotor through orifices in the opposite end face of the rotor, and flow radially-outwardly towards the stator along the end face. The speed at which the oil flows through the fluid passages can be dependent on rotor angular velocity (i.e., higher angular velocity results in higher fluid flow). At higher angular velocities, the rotor can generate significant fluid pumping action.

In the past, rotating electrical machines have relied on an oil pump directly coupled to a hollow motor shaft to supply pressurized cooling fluid. In some implementations, fluid has been splashed onto an end face of a rotor and centrifugal force directs it over the end face on the outer surface of the rotor to the stator. But this may not cool the core of the rotor and a number of challenges exist with this system. As rotor speeds increase, the demand on the pressurized supply of oil can be high and challenging to maintain. Also, hollow motor shafts may increase cost and complexity. Rather than rely on a pressurized supply of oil from an oil pump, the supply of oil to the rotor can be decoupled from the pressure generated by the pump. That is, the proposed system would not use a fixed, continuous, pressurized fluid passageway communicating oil from the pump to the rotor. Instead, an oil supply spout can spray oil toward and onto an end face of the rotor. Axially-extending fluid passages can be punched or otherwise formed in a rotor (see below). A balance ring coupled to the end face can have an inner diameter that is shaped to direct received fluid into the axially-extending passageways within the rotor and the fluid flows toward an opposite end face. In some implementations, the balance ring can include fluid manifolds that confront an end face of the rotor and communicate fluid between one axially-extending fluid passage and another axially-fluid passage that is a different radial distance from the axis of shaft rotation.

Figure 1:
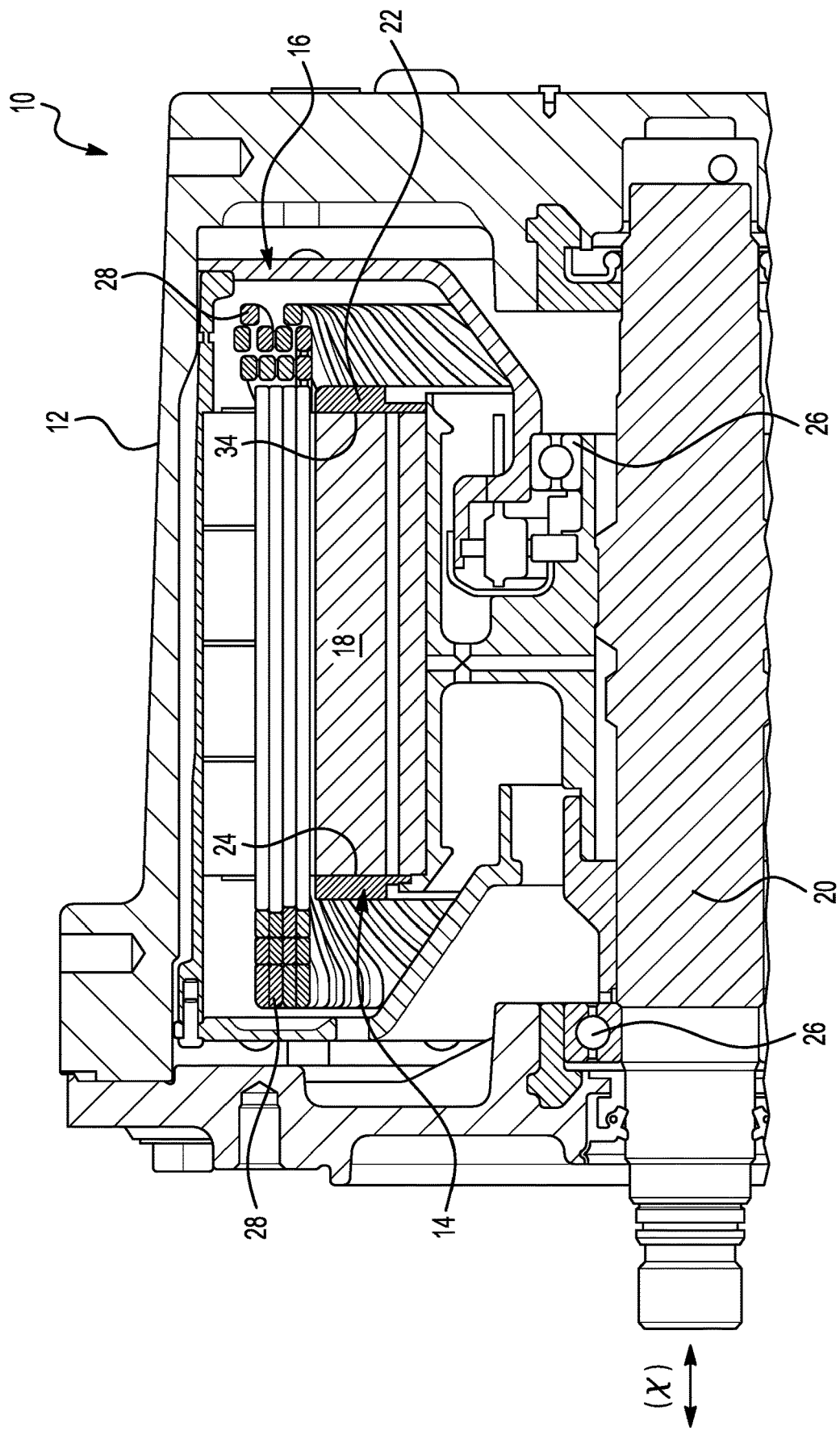
FIG. 1 is a cross-sectional view depicting an implementation of a rotating electrical machine having a rotor with fluid passages.

FIG. 1 shows an implementation of an electric motor 10. The electric motor 10 includes a housing 12, a rotor assembly 14, and a stator assembly 16. The rotor assembly 14 is mostly located and supported within the housing 12. The rotor assembly 12 includes a rotor 18 and an output shaft 20. The rotor 18 can be formed from a number of laminated sheets of iron that are stacked axially along the axis of shaft rotation (x) and bonded together to form the rotor 18. A balance ring 22 can be positioned on one end face 24 of the rotor, or both one end face 24 and an opposite end face 34 of the rotor 18, and shaped to receive a flow of cooling fluid, such as engine oil. This will be discussed in more detail below. The output shaft 20 can be press-fit into an inner diameter of the rotor 18 to prevent the angular displacement of the output shaft 20 relative to the rotor 18, and a portion of the shaft 20 can protrude out of the housing 12. Bearings 26 can be received within the housing 12 and support the output shaft as it rotates. The stator assembly 16 is located and supported within the housing 12. The stator assembly 16 can include laminations that are stacked axially together and bonded to form the shape of the stator, including stator slots. The stator can receive stator windings 28 within the stator slots and the selective flow of electrical current through the stator windings 28 can induce angular movement of the rotor assembly 14 relative to the stator assembly 16.

Figure 2:
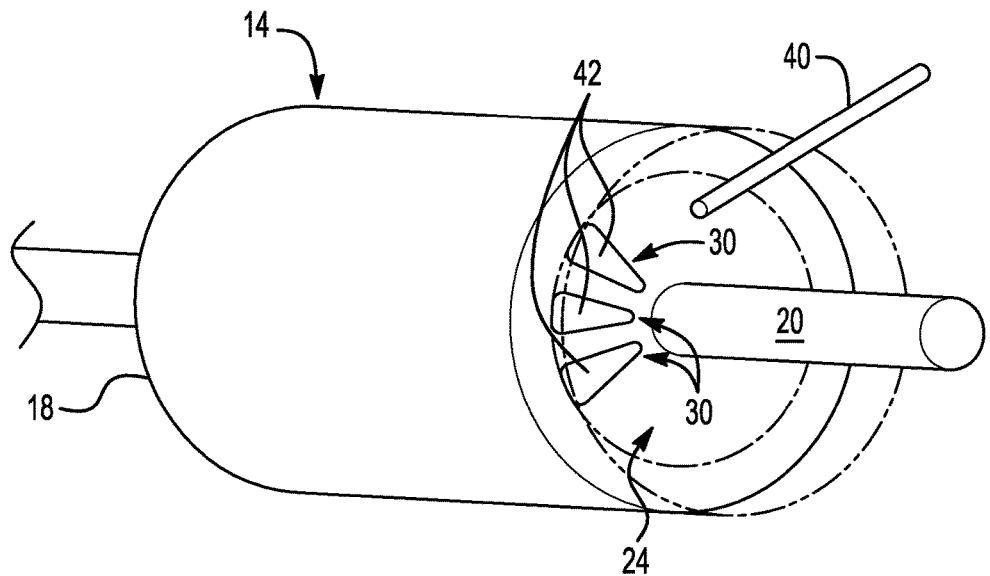
FIG. 2 is a perspective view depicting a portion of an implementation of a rotating electrical machine having a rotor with fluid passages.
Figure 3:
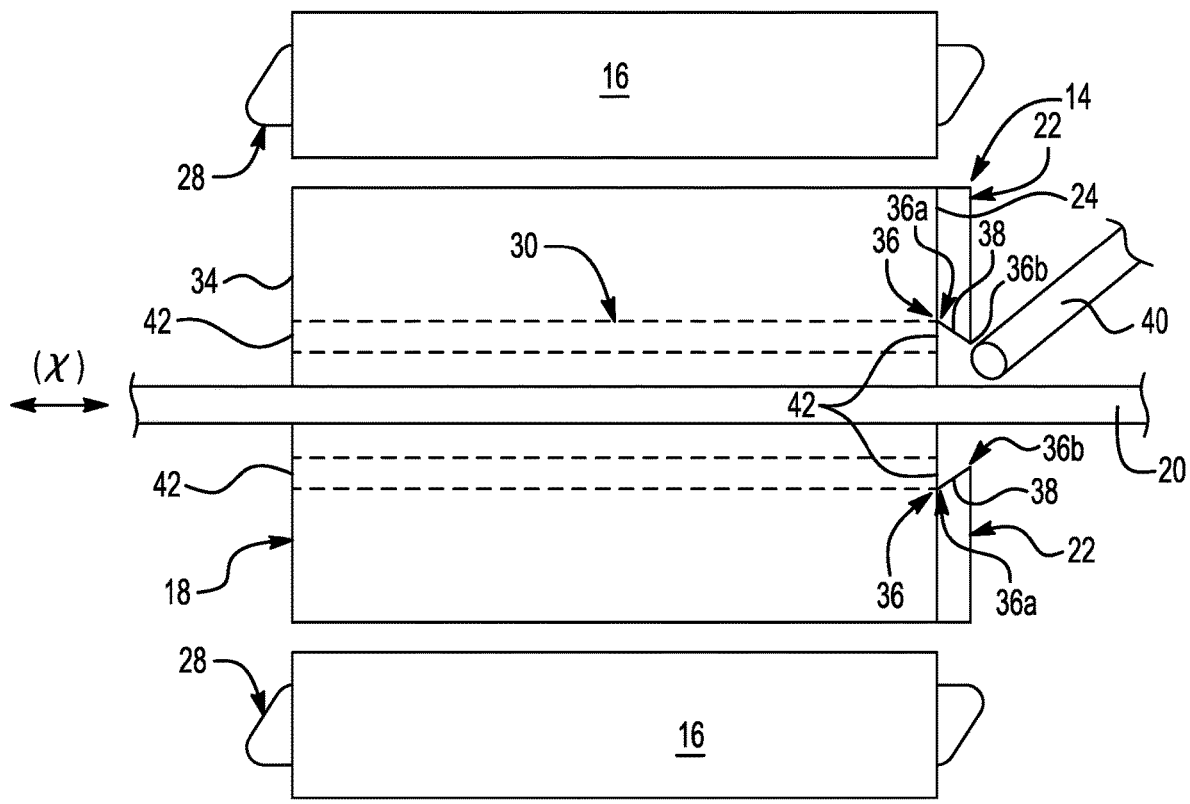
FIG. 3 is a cross-sectional view depicting an implementation of a rotating electrical machine having a rotor with fluid passages.

FIGS. 2 and 3 show an implementation of the rotor assembly 14 in more detail. The rotor assembly 14 is shown with the rotor 18 having an axially extending fluid channel 30 in fluid communication with the end face 24 of the rotor 18. A balance ring 22 can be coupled to the end face 24 of the rotor 18. An inner diameter 36 of the balance ring 22 can have a shaped surface 38 designed to receive fluid on the surface 38 and direct the fluid toward the axially extending channel 30. A fluid outlet 40 is positioned adjacent the end face 24 of the rotor 18 and the shaped surface 38 of the balance ring 22. The fluid outlet 40 is separated from the rotor 18 by a distance such that the fluid exits the outlet 40 and then travels outside of the outlet 40 for a distance before landing on the end face 24 of the rotor 18 and/or the balance ring 22. During operation, as electrical current flows through the stator windings 28 thereby inducing angular displacement of the rotor assembly 14 relative to the stator assembly 16, the centrifugal force created can urge fluid received at the end face 24 of the rotor 18 into the axially-extending fluid channel 30 and out an opposite end face 34 of the rotor 18 at a distal end of the rotor assembly 14.

The rotor 18 includes at least one axially-extending fluid channel 30, that opens to at least one end face 24 of the rotor 18, and extends within the rotor 18 along the axis of rotation (x). Other implementations are possible in which more than one axially-extending fluid channel 30 is formed with one channel 30 positioned radially-inward relative to another axially-extending channel 30. Each of these axially-extending fluid channels 30 can extend from one end face 24 of the rotor 18 to the opposite end face 34 of the rotor 18 with fluid openings 42 or orifices on both end faces 24, 34. In such an implementation, a fluid outlet 40 can be positioned adjacent one end face 24 of the rotor 18 and another fluid supply outlet 40 can be positioned adjacent the opposite end face 34 of the rotor 18. The axially-extending fluid channel 30 may not be precisely parallel with the axis of rotation (x) and may angle or pitch as it extends away from the end face 24 of the rotor 18, radially-outwardly away from the axis of rotation (x) to facilitate the flow of fluid. It is possible to form the axially-extending fluid channels 30 in a variety of ways. For example, the rotor 18 can be formed from a plurality of thin plates of steel bonded or laminated together and extending in an axial direction with respect to the axis of rotation. The axially-extending fluid channels 30 can be collectively formed by punching a hole in each plate using a punch die and, when the plates are axially aligned, the punched holes form the fluid channels 30.

The axially-extending fluid channels 30 can be relatively evenly spaced angularly so that as the rotor 18 spins the application of fluid onto the stator assembly 16 is relatively even as well. The quantity or diameter of the axially-extending fluid channels 30 can be determined and selected based on a fluid flow rate desired considering the fluid flow from the fluid outlet(s) 40 and the range of angular velocity of the rotor 18.

The balance ring 22 can be fixed to at least one end face 24 of the rotor 18. The balance ring 22 can have a first inner diameter 36*a* adjacent the angularly-spaced axially-extending fluid channels 30. The shaped surface 38 can extend from the first inner diameter 36*a* to a second inner diameter 36*b*, such that the inner diameters 36 are different. In this implementation, the shaped surface 38 can be frustoconical, configured to receive fluid applied by the fluid outlet 40 and direct the fluid into the axially-extending fluid supply channel(s) 30. However, it should be appreciated that the shaped surface can be created using a number of different techniques and shaped in different ways. For instance, the plates that are bonded or laminated together can each be shaped to create the shaped surface. Each plate can be shaped during stamping such that an end face of the rotor created by the assembly of plates can be bent or shaped in such a way that, when the plates are bonded together, the end face of the rotor is shaped to direct fluid into the axially-extending channels.

The fluid outlet(s) 40 can supply a cooling fluid directed toward the end face(s) 24 of the rotor 18. The cooling fluid can be implemented in a variety of ways. In one implementation, the cooling fluid can be supplied from a dedicated cooling circuit and the fluid can be what is commonly used as transmission fluid. The flow of fluid could be variably controlled using a solenoid to flow a desired amount of fluid. For example, the solenoid could be controlled to flow fluid from the fluid outlet onto the end face 24 of the rotor 18 at a rate of 0.5 liters-per-hour (lpm) to 2.0 lpm. As the fluid flows into the axially-extending fluid channels 30, the centrifugal force created by the rotation of the rotor 18 can draw it through the channels 30 and expel it out the opposite end face 34 of the rotor 18. The higher the angular velocity of the rotor 18, the increased flow rate of fluid through the axially-extending fluid channels 30. That is, the flow rate of fluid out of the fluid outlet 40 may be constant but the flow rate of fluid through the rotor 18 can vary nonetheless based on an angular velocity of the rotor 18. In that sense, the flow of fluid through the rotor 18 is uncoupled from the rate of fluid flow from the fluid outlet 40.

Figure 4:
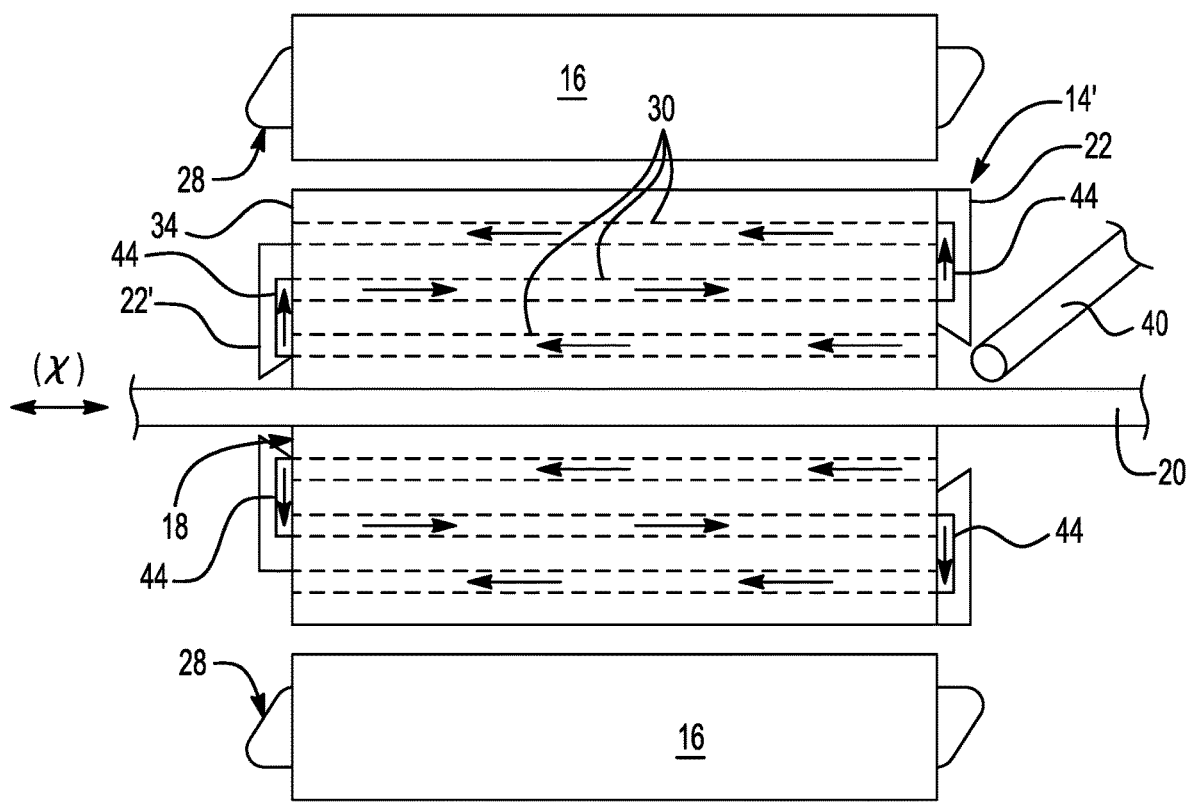
FIG. 4 is a cross-sectional view depicting another implementation of a rotating electrical machine having a rotor with fluid passages.

Turning to FIG. 4, another implementation of the rotor assembly 14' is shown. The rotor assembly includes a balance ring 22 on an end face of the rotor 18, a plurality of axially-extending fluid channels 30, and a second balance ring 22' on an opposite end face 34 of the rotor 18. The plurality of axial extending fluid channels 30 can be fluidly connected via fluid manifolds 44 formed in between the balance ring and the end face of the rotor. Fluid can enter an axially-extending fluid channel 30 at the end face 24 of the rotor 18, travel toward the opposite end face 34 of the rotor 18 and enter a fluid manifold 44 in between the second balance ring 22' and the opposite end face 34. The fluid manifold 44 can connect the axially-extending fluid channels 30 at the opposite end face 34 such that the fluid changes direction and flows toward the end face 24. The balance ring 22 can include another fluid manifold 44 that fluidly connects axially-extending fluid channels 30 at the end face 24. The fluid can then flow toward the opposite end face 34 and exit the rotor 18.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A rotating electric machine receiving a flow of fluid at a rotor, comprising:
    a stator having stator slots and a plurality of stator windings for receiving electrical current;
    the rotor, concentrically received within the stator, including:
        a plurality of axially-extending fluid channels, angularly spaced within the rotor around an axis of rotation, in fluid communication with an end face of the rotor and an opposite end face of the rotor, wherein the axially-extending fluid channels are configured to receive fluid applied by a fluid outlet spaced a distance from the end face of the rotor;
        a first balance ring, coupled to the end face, having a shaped portion that directs fluid exiting the oil supply spout to the axially-extending fluid channels; and
        a second balance ring, coupled to the opposite end face of the rotor and radially offset from the first balance ring relative to an axis of shaft rotation, having a fluid manifold that communicated fluid from one axially-extending fluid channel to another axially-extending fluid channel.

2. The rotating electric machine recited in claim 1, wherein the shaped portion is frustoconical.

3. The rotating electric machine recited in claim 1, wherein the fluid outlet supplies transmission fluid to the end face of the rotor.

4. The rotating electric machine recited in claim 1, further comprising a solenoid that varies the flow of fluid through the fluid outlet.

* * * * *